US008584491B2

(12) United States Patent
Bogdahn et al.

(10) Patent No.: US 8,584,491 B2
(45) Date of Patent: Nov. 19, 2013

(54) DRAWING METHOD FOR PRODUCING CYLINDRICAL-SHAPED COMPONENTS FROM QUARTZ GLASS

(75) Inventors: Thomas Bogdahn, Karlstein (DE); Oliver Ganz, Bruchkoebel (DE); Harald Hain, Kahl (DE); Ralph Sattmann, Aschaffenburg (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 13/138,767

(22) PCT Filed: Feb. 17, 2010

(86) PCT No.: PCT/EP2010/051961
§ 371 (c)(1),
(2), (4) Date: Oct. 4, 2011

(87) PCT Pub. No.: WO2010/108730
PCT Pub. Date: Sep. 30, 2010

(65) Prior Publication Data
US 2012/0011889 A1    Jan. 19, 2012

(30) Foreign Application Priority Data
Mar. 26, 2009  (DE) .......................... 10 2009 014 418

(51) Int. Cl.
*C03B 37/16* (2006.01)
(52) U.S. Cl.
USPC .......................................................... 65/433
(58) Field of Classification Search
USPC ........... 65/376–401, 403, 405–412, 424–434, 65/436, 439–452, 480
See application file for complete search history.

(56) References Cited

U.S. PATENT DOCUMENTS

| 3,035,371 | A |   | 5/1962 | Mouly et al. |
| 5,026,413 | A | * | 6/1991 | Lebert et al. ................. 65/29.13 |
| 5,942,019 | A | * | 8/1999 | Saito et al. ..................... 65/382 |
| 6,425,270 | B1 | * | 7/2002 | Suzuki et al. .................. 65/379 |
| 6,516,636 | B1 | * | 2/2003 | Gansicke et al. ............... 65/379 |
| 6,715,317 | B1 | * | 4/2004 | Brauer et al. ................ 65/29.14 |
| 6,938,442 | B1 | * | 9/2005 | Schmitt et al. ................. 65/381 |

(Continued)

FOREIGN PATENT DOCUMENTS

DE    39 13 875 C1    8/1990
EP    0 394 640 A1    10/1990

(Continued)

OTHER PUBLICATIONS

JP2003238185 machine translation by http://dossierl.ipdl.inpit.go.jp/AIPN/odse_call_transl.ipdl?NOOOO=7413&NOOO5=Ei7BzenZVnBvfz7D1ZIK&NO120=01&N2001 =2&N3001=2003-238185&Ntt3=chemistryV14&Ntt4=machineV14&Ntt5=productsV14&Ntt6=&Ntt7=&Ntt8=&Ntt9=&Ntt 10=&Nttl 1 =&Ntt12= on Sep. 25, 2012.*

(Continued)

*Primary Examiner* — Jodi C Franklin
(74) *Attorney, Agent, or Firm* — Tiajoloff and Kelly LLP

(57) ABSTRACT

The present invention refers to a drawing method for producing cylindrical components of quartz glass in that a quartz glass strand is drawn off in the direction of a drawing axis from a shaping zone of soft quartz glass mass and sections having a cutting length are separated from the quartz glass strand, and the cylindrical components are produced from the sections.

11 Claims, 3 Drawing Sheets

(56) References Cited

U.S. PATENT DOCUMENTS

Figure 1:
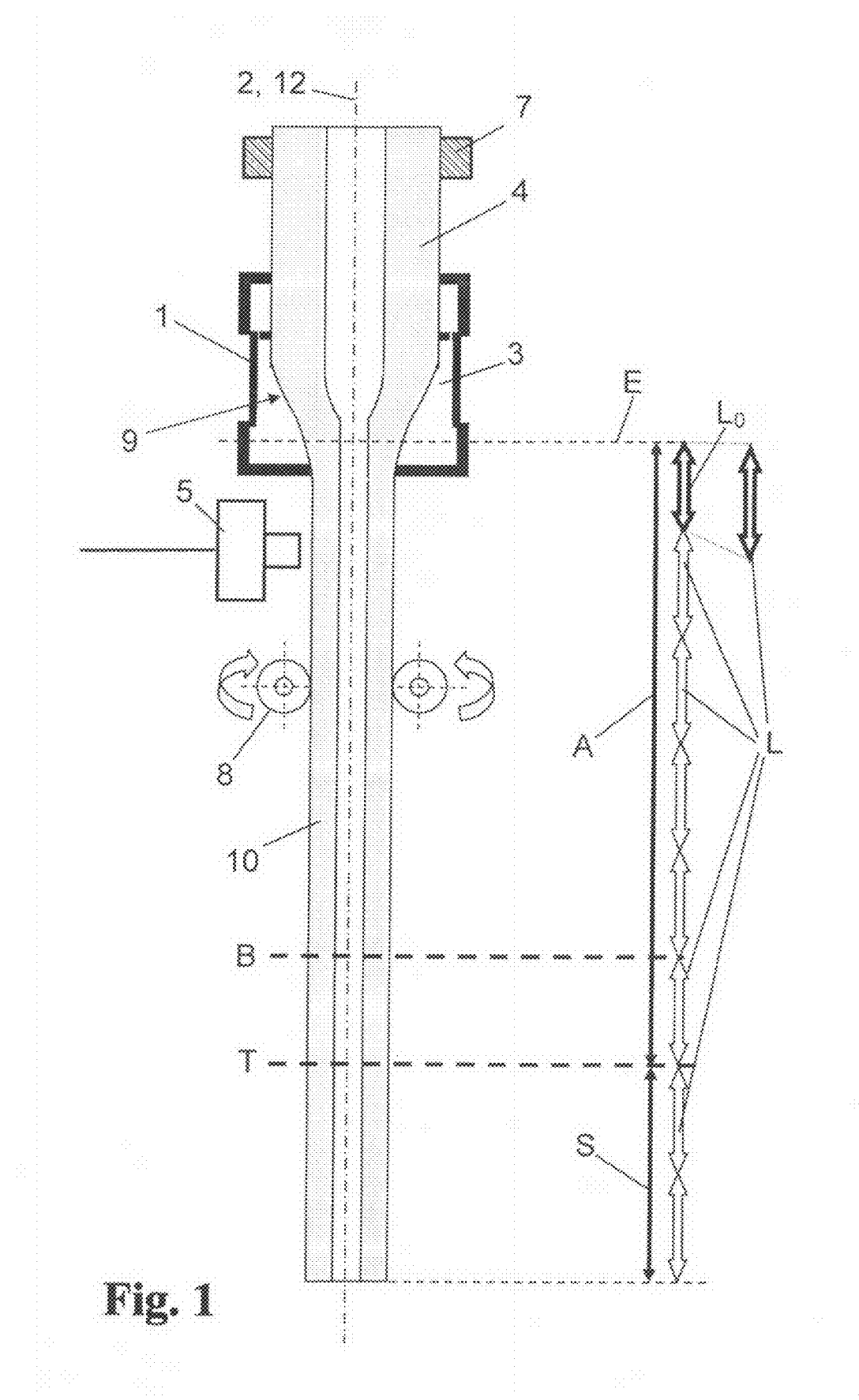

| | | | |
|---|---|---|---|
| 7,600,399 B2* | 10/2009 | Bogdahn et al. | 65/381 |
| 7,797,965 B2* | 9/2010 | Cibis et al. | 65/108 |
| 7,854,146 B2* | 12/2010 | Sowa et al. | 65/412 |
| 7,891,213 B2* | 2/2011 | Bogdahn et al. | 65/378 |
| 2003/0071229 A1* | 4/2003 | Ishidoya et al. | 250/484.5 |
| 2006/0191294 A1* | 8/2006 | Ganz et al. | 65/404 |
| 2009/0019893 A1* | 1/2009 | Bogdahn | 65/108 |
| 2010/0132407 A1* | 6/2010 | Ganz et al. | 65/108 |
| 2010/0260949 A1* | 10/2010 | Ganz et al. | 428/34.1 |
| 2011/0197634 A1* | 8/2011 | Eta | 65/97 |

FOREIGN PATENT DOCUMENTS

| | | |
|---|---|---|
| GB | 943305 A | 12/1963 |
| JP | 05-178634 A | 7/1993 |
| JP | 2003-238185 A | 8/2003 |
| JP | 2004-137095 A | 5/2004 |

OTHER PUBLICATIONS

Espacenet abstract for JP 2004-137095 A, May 13, 2004.
Espacenet abstract for JP 05-178634 A, Jul. 20, 1993.
Espacenet abstract for JP 2003-238185 A, Aug. 27, 2003.

* cited by examiner

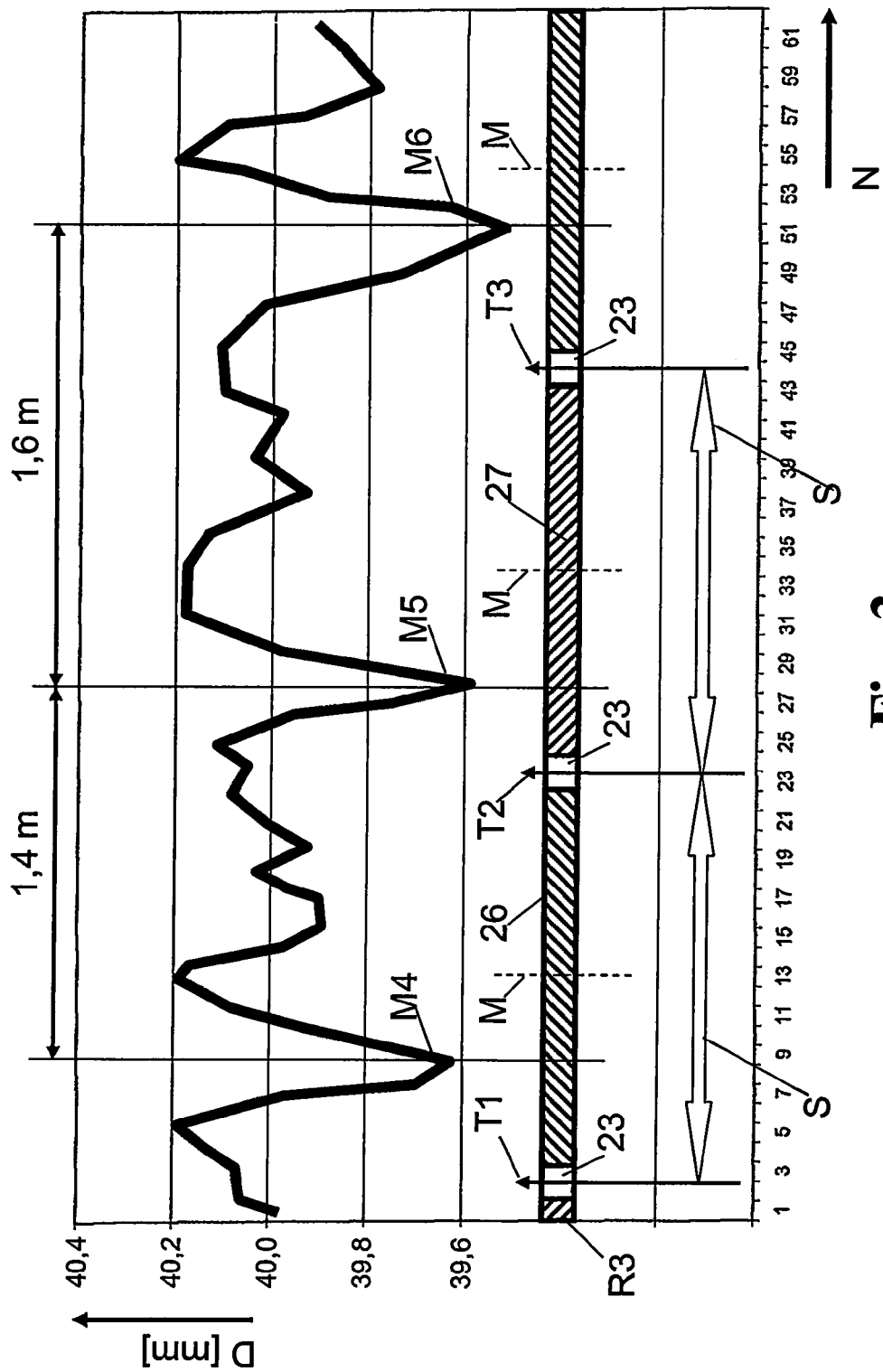
Fig. 3 (state of the art)

DRAWING METHOD FOR PRODUCING CYLINDRICAL-SHAPED COMPONENTS FROM QUARTZ GLASS

The present invention refers to a drawing method for producing cylindrical components of quartz glass in that a quartz glass strand is drawn off in the direction of a drawing axis from a shaping zone of soft quartz glass mass and sections having a cutting length are separated from the quartz glass strand, and the cylindrical components are produced from the sections.

PRIOR ART

When glass tubes or glass rods are continuously drawn from a crucible or from a preform, the problem arises that the glass strand must be cut off into sections of a predetermined length. To this end a predetermined breaking point is first formed by wounding, e.g. by way of scratching or cutting, the external surface area normally on the external surface of the glass strand that is moving in the direction of its longitudinal length, and the glass strand is subsequently broken at the predetermined breaking point. The glass strand is normally broken by means of a force acting in pulse-like fashion on the area of the predetermined breaking point, e.g. by way of a stroke.

The mechanical pulse during the separating action may cause defects or disorders in the quartz glass strand geometry, particularly diameter variations.

When tubes are drawn at an internal pressure differing from the pressure applied from the outside, an additional problem will arise. A shortening of the tubular strand length will lead to an abrupt change in the internal pressure due to a change in flow resistance, which may also cause variations in the diameter and wall thickness of the tubular strand to be drawn off.

To reduce at least the geometrical variations caused by the varying flow resistance, EP 0 394 640 B1 suggests that the tubular strand should be separated under water or in a pressure chamber in which a pressure similar to the internal pressure is prevailing. This procedure, however, is constructionally complicated and has no influence on disorders in the quartz glass strand geometry caused by the mechanical separation pulse.

Especially with applications where high demands are made on the dimensional stability of the component, diameter variations may lead to waste.

A method for reducing waste of material is described in JP 2004-137095 A1. For making an optical preform the so-called "rod-in-tube technique" is used, wherein an assembly made up of a glass cladding tube and a glass rod inserted thereinto is elongated into a preform. It is suggested that during elongation visually recognizable defects should be detected in the drawn-off preform strand and that the preform strand should be separated at the defective locations. It is thereby possible to move the defective locations to the ends of the preform where they are less objectionable.

The method, however, requires some efforts for detecting and tracing the defects up to the separation position. The method yields preform pieces of different length, which in subsequent method steps, e.g. cladding during fiber drawing, requires complicated individual adaptations.

TECHNICAL OBJECT

It is the object of the present invention to provide a simple drawing method for producing quartz glass components, wherein the impacts of geometrical disorders, particularly diameter variations and waste of material, are reduced.

Starting from a drawing method of the aforementioned type, this object is achieved according to the invention in that the quartz glass strand is separated at a separation position which has a distance from the shaping zone that is set such that a disorder in the quartz glass strand geometry caused by the separation comes to lie in a subsequent separation step in an end region of the component to be produced or between two adjacent components.

When the quartz glass strand is cut off, the operator normally pays attention that the length of the cut-off strand piece has a minimum dimension and preferably corresponds as exactly as possible to the cutting length to minimize the waste of material. The residual length of the quartz glass strand—from the shaping zone up to the separation position—plays no role here. Thus in this respect the operator has so far been free to cut off the leaving quartz glass strand e.g. rather early at a position close to the shaping zone or rather late at a position further remote from the shaping zone as long as the separated section has the desired dimension. For the same reason the exact position of the shaping zone, which can vary depending on the temperature, has so far only been of minor importance to the separating process.

By contrast in the method according to the invention it is intended that the quartz glass strand is always separated at a predetermined distance from the shaping zone, independently of the detection of possible defects, diameter variations or other disorders. Hence, as is also otherwise customary, the separation position depends on the desired length of the cut-off section of the quartz glass strand, but also on the residual length of the remaining quartz glass strand. Therefore, during separation according to the drawing method of the invention, attention has to be paid to both the cut-off strand length and the residual length thereof.

This procedure does not aim at avoiding disorders in the quartz glass strand geometry, particularly diameter variations, when the quartz glass strand is cut off, but it is suited to position possible disorders in those regions of the quartz glass strand that coincide with end regions of the cylindrical quartz glass components to be produced or lie between adjacent components.

This can be explained by the fact that the diameter variations (or other disorders in the quartz glass strand geometry) produced by mechanical impacts during separation, caused either by the mechanical separation pulse or by an abrupt change in the flow resistance, can only arise in the region of the softened quartz glass mass, and that these diameter variations are no longer eliminated after the shaping zone has been left, but travel during the further drawing process towards the separation position. Since during separation the distance between the separation position and the region of origin of diameter variations is taken into account, it can be ensured that the diameter variations produced thereby in the shaping zone are located at the separation position when the quartz glass strand is cut off later. This means that the previously produced diameter variations are located in an end region of the separated section and/or at the end of the residual strand and thus in an end region of another section.

The distance of the separation position from the "shaping zone" is here decisive. This is the region that is subjected to maximum plastic deformation due to the impact on the quartz glass strand during the separating process, i.e. the region of origin of the disorders in the quartz glass strand geometry, particularly the diameter variations. The distance between said region of origin and the separation position has to be set such that the diameter variations produced during separation arise in a region of the softened quartz glass mass that finally in the elongated quartz glass strand forms an end region of the separated section or that in the cutting waste comes to lie between sections.

Knowledge of the absolute position of the shaping zone is not required for carrying out the method according to the invention. The optimum position of the separation position relative to the shaping zone is empirically determined in the simplest case. An iterative procedure is here recommended, in which the separation position is first set to have a distance from the shaping zone that corresponds one time or several times to the cutting length. The interfering pulse produced at the position defined in this way during separation of the quartz glass strand produces diameter variations that during later separation of the quartz glass strand come to lie at the same separation position, normally in the separated section. The separation position is then shifted by a corresponding path until the diameter variations come to lie exactly at the separation point. Instead of an empirical localization (which should be preferred at any rate), a simple path measurement may also be sufficient in a first approximation. For instance in a crucible pulling method, the position of the exit of the softened quartz glass mass from the drawing nozzle can be assumed as the region of origin of the diameter variations, and in an elongation method the lower region of the drawing bulb. Since the smaller drawing bulb end is more likely to react to mechanical pulses due to its smaller quartz glass mass than the thicker beginning of the drawing bulb, the position at which the quartz glass strand has reached a diameter that is still 20% greater than the end diameter is defined as the shaping zone (=region of origin of the diameter variations).

A preceding formation of a predetermined breaking point on the quartz glass strand is independent of the separation position. The predetermined breaking point on the quartz glass strand can be formed any time even if the predetermined breaking point is still remote from the separation position. It is of prime importance that the quartz glass strand is only separated after the predetermined breaking point has reached the separation position.

It is thereby possible to shift disorders in the quartz glass strand geometry, particularly diameter variations, induced by the separation of the quartz glass strand, into end regions of the quartz glass components to be produced or into regions outside of said components without the need for a complicated measuring technique for detecting the disorders in the quartz glass strand geometry.

The cutting length separated from the quartz glass strand corresponds to the desired length of the quartz glass component to be produced, with or without allowance, or to an integral multiple of the component length (with or without allowance). An allowance is needed as a rule for correcting end faces or for eliminating fractures at the edge which are produced during separation.

The quartz glass strand is preferably separated at a separation position which has a distance from the shaping zone that is determined on the basis of the cutting length. Specifically, the quartz glass strand is separated at a separation position which has a distance from the shaping zone that is chosen such that the quartz glass strand obtained from the quartz glass mass between shaping zone and separation position has a length corresponding one time or multiple times to the cutting length.

Diameter variations are caused by plastic deformations in the region of the softened quartz glass mass. The distance between the separation position and the shaping zone (=region of origin of maximum plastic deformation) is set such the length of the quartz glass strand drawn therefrom corresponds to the cutting length or to an integral multiple of the cutting length. This ensures that diameter variations caused during separation of the quartz glass strand come to lie in a later separation process either at the upper end of the cut-off section and/or at the lower end of the remaining glass strand.

Attention should be paid that the strand length produced from the shaping zone is greater than the corresponding length of the shaping zone. Therefore, the distance between separation zone and shaping zone does usually not correspond to the cutting length (or an integral multiple thereof). It is important in this separating process that the distance "A" of the separation position from the shaping zone is chosen such that the quartz glass mass present within this distance yields a quartz glass strand having a length that is an integral multiple "n" of the cutting length "L". Deviations of +/−10% from the cutting length are acceptable, depending on the intended use of the component to be produced, i.e.

$$A = n \times L \pm 0.1 \times L$$

The method according to the invention will have a particularly advantageous effect when the shaping zone is produced such that a quartz glass cylinder is continuously fed to a heating zone, softened therein zonewise and the quartz glass strand is drawn off with formation of a drawing bulb.

A quartz glass cylinder is here started from that is elongated into the quartz glass strand. In such drawing methods a drawing bulb is formed which reacts in a particularly sensitive to mechanical interfering pulses, e.g. when the quartz glass strand is cut off.

Since in the method according to the invention changes in geometry are normally shifted into the end regions of the quartz glass component to be produced, the method is suited for both tubular components and solid cylinders. However, it has turned out to be particularly advantageous when a tubular quartz glass strand is drawn off from the shaping zone, with a pressure being produced and maintained in the tubular quartz glass strand.

In this variant of the method, a reduced or increased pressure as compared with the externally applied pressure is maintained in the tubular quartz glass strand. A higher internal pressure is here produced as a rule by a gas flow in the inner hole of the tubular strand. During separation of the tubular strand the flow resistance is suddenly changed, which may lead to diameter variations in the softened region. Especially in this variant of the method, pronounced plastic deformations of the drawn-off tubular strand may arise, and it is therefore very important that these be shifted into a region that in the end comes to lie at the ends of the quartz glass component to be produced. This is done according to the invention in that the separation position always has such a distance from the shaping zone that it yields a quartz glass strand with a length corresponding to an integral multiple of the nominal cutting length.

The method according to the invention has turned out to be particularly useful in a drawing method in which the tubular quartz glass strand comprises a lower end which is closed at least in part by means of a gaseous, liquid, plasma-like or solid flow obstacle.

Closing the lower end of the tubular strand reduces the entry of impurities, helps to save gas for maintaining a desired internal pressure and diminishes a possible cooling action by the flowing gas. However, when the tubular strand is separated, the flow resistance is very much changed, which leads to correspondingly great diameter or wall thickness variations. With the help of the method according to the invention these can be shifted into regions of the separated tubular strand sections in which they are not or less objectionable.

A thin wall in the softened region reacts to mechanical pulses in a particularly sensitive way. Therefore, the method according to the invention manifests itself in a particularly advantageous way when thin-walled quartz glass tubes are drawn. A method variant is therefore preferred in which a tubular quartz glass strand is drawn off at a wall thickness ranging from 0.1 mm to 6 mm.

It has turned out to be useful when the separation position has such a distance from the shaping zone that the quartz glass strand obtained from the quartz glass mass between shaping zone and separation position has a length that is three to ten times the cutting length.

The separated section is kept small in comparison with the residual strand. Pressure variations can thereby be minimized during separation.

The quartz glass strand is normally separated in that a predetermined breaking point is produced on the quartz glass strand in advance. In a preferred variant of the method it is intended that separating the quartz glass strand comprises a method step in which the quartz glass strand is provided with a predetermined breaking point at a first point of time and is separated at the separation position at a second point of time by a force acting in the area of the predetermined breaking point.

Preferably, the cutting length is an integral multiple of a predetermined section length, and the predetermined breaking point is here formed at a predetermined breaking point forming position that has a distance from the separation position corresponding to the predetermined section length or a multiple thereof.

The predetermined section length corresponds to the desired component length with or without allowance. Also when the predetermined breaking point is formed, forces, though comparatively small ones, can act on the quartz glass strand that may lead to a geometrical disorder. In the above-mentioned procedures these disorders pass either between cut-off sections of the quartz glass strand or at the ends thereof, or they pass into end regions of sections from which the components are made.

Alternatively, it is also advantageous when forming the predetermined breaking point at a predetermined breaking point forming position and separating the quartz glass strand are performed almost at the same time.

A period as short as possible, e.g. 0.5 to 5 seconds, lies between the formation of the breaking point and the separating process, so that the respectively produced disorders superpose one another and occur in a joint region of the quartz glass strand.

It is intended in a preferred variant of the method that disorders in the quartz glass strand geometry are detected continuously and that the separation position is set in response to the detected disorders.

Changes in process parameters, particularly changes in the temperature, may occur in the course of the drawing process. This may change the shape or position of the shaping zone in the course of the process, which has an effect on the location of the separation position. In this variant of the method a continuous adaptation and optimization of the separation position is possible.

The detection of the disorders over the whole length of the quartz glass strand can also be used for an automated setting of the optimal separation position. A diameter profile of the drawn-off strand is here detected and the separation position is set in a computer-controlled manner on the basis of the predetermined cutting length and on the basis of the determined distances between maxima of the diameter variations.

EMBODIMENT

Figure 2:
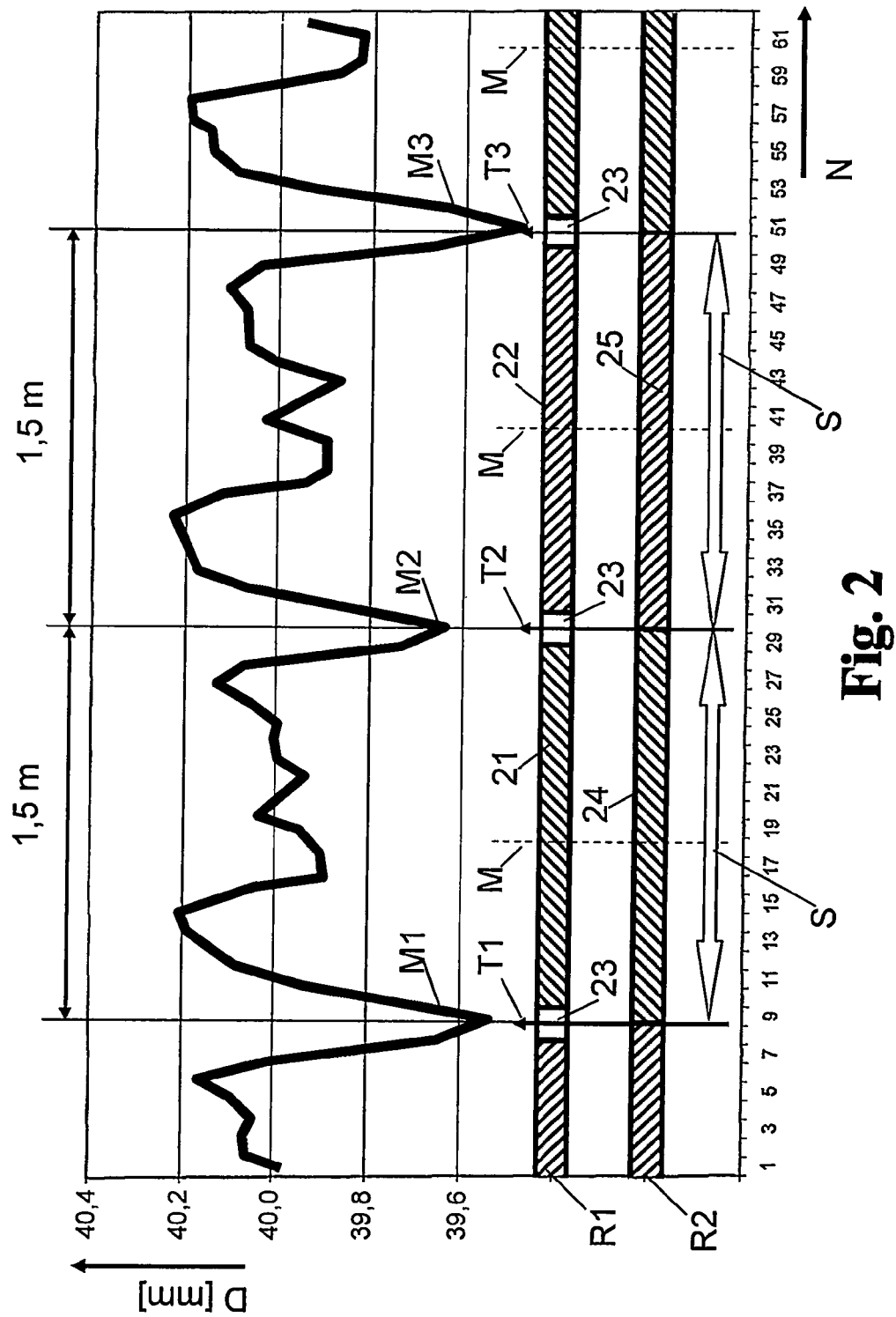

The invention shall now be explained in more detail with reference to embodiments and a drawing. In a schematic illustration, FIG. 1 shows a device for performing the method according to the invention;

FIG. 2 shows a diagram with a typical extension of the diameter across a section of a tubular strand and a distribution over tube sections in two variants according to the invention; and FIG. 3 a diagram with a typical extension of the diameter across a section of a tubular strand and a distribution over tube sections according to the prior art.

The device according to FIG. 1 shows a resistance heater with a vertically oriented heating tube 1. The heating tube 1 consists of an annular graphite element with an inner diameter of 193 mm, an outer diameter of 215 mm, and it encloses a heating zone 3 with a length of 100 mm.

A hollow cylinder 4 of quartz glass is supplied to the heating tube 1, the hollow cylinder having a longitudinal axis 12 which is oriented as parallel as possible with the drawing axis 2. The upper end of the hollow cylinder 4 is connected to a holding means 7 by which it is displaceable in horizontal direction (xy), movable upwards and downwards in vertical direction and rotatable about the drawing axis 2.

The hollow cylinder 4 is softened in the heating zone 3 and a tubular strand 10 is drawn off vertically downwards from the softened region with formation of a drawing bulb 9. A roll dragging means 8 comprising two draw-off rolls that are opposite to each other at the same height plane on the cylinder jacket of the tubular strand 10 serves as a draw-off means.

The drawing bulb 9 has arranged thereunder a diameter measuring instrument 5 by means of which a diameter profile of the drawn-off tubular strand 10 is recorded during the drawing process and can be analyzed by means of a computer.

An embodiment for performing the drawing method according to the invention for producing a quartz glass tube is explained in more detail hereinafter with reference to FIG. 1.

In the vertically oriented heating tube 1, a hollow cylinder 4 of quartz glass with an outer diameter of 145 mm and an inner diameter of 60 mm is adjusted such that its longitudinal axis 12 extends in the central axis of the heating tube 1, which conforms to the drawing axis 2 at the same time.

The hollow cylinder 4 of quartz glass is subsequently lowered at a constant feed rate into the heating tube 1 and is heated therein to a temperature above 2100° C., wherein the quartz glass tube 10 is drawn off from the developing drawing bulb 9 at a controlled draw rate to a desired outer diameter of 40 mm and a desired wall thickness of 2 mm. A pressure which is higher than the external pressure is maintained in the inner hole of the tubular strand 10.

A diameter profile of the drawn-off tubular strand 10 is continuously produced by means of the diameter measuring instrument 5, as will be explained further in more detail with reference to FIG. 2. The measurement values obtained thereby are used for controlling the draw-off rate of the tubular strand 10.

The nominal component length, including an allowance, is 0.75 m. The drawn-off tubular strand 10 is cut off into sections of 1.5 m each, from which two tubes with a length L of 0.75 m are obtained each time. Tubular quartz glass components with the final dimension of 0.70 m are made from them. Hence, the cutting length S is 1.5 m, with an allowance of 5 cm being provided at both ends of the separated section. It is here essential that the separation plane T in which the tubular strand 10 is separated has a distance A from the drawing bulb 9 that is set such that the quartz glass mass present at the distance yields a strand length conforming to an integral multiple of the cutting length S (=1.5 m). In the embodiment, distance A is slightly less than three times the nominal cutting length S, which is due to the fact that the longitudinal section between the plane E of the drawing bulb 9 and the region in which the quartz glass strand has reached its desired outer diameter, and which is represented by the block arrow $L_0$, is slightly shorter than the desired component length L which is finally obtained in the longitudinal section $L_0$ after elongation from the quartz glass mass.

In a first approximation the path between the separation plane T and the height position E of the drawing bulb 9 where the diameter of the drawn-off tubular strand 10 corresponds to about 1.2 times its nominal diameter can be defined as the distance A between separation plane T and drawing bulb; thus in the embodiment at an outer diameter of about 48 mm. The height position is here assigned to the shaping zone in which maximal plastic deformation occurs when the tubular strand 10 is cut off in the separation plane T.

For the sake of simplicity the difference between $L_0$ and L will be disregarded in the following explanations and the distance between separation plane T and shaping zone 9 will be equated in a first approximation to three times the cutting length S.

Prior to separation a predetermined breaking point is formed on the quartz glass strand, namely at a predetermined breaking point forming position B that has a distance of 75 cm from the separation position T.

FIG. 2 shows a typical extension of the diameter D (in mm) across a section of the tubular strand 10 having a length of about 4.5 m and a nominal diameter of 40 mm. The number N of the measurement points of the outer diameter that is proportional to the tubular strand length is plotted on the x-axis.

The diameter curve has a number of minima and maxima that are approximately evenly distributed over the tubular strand section. Particularly pronounced minima M1, M2 and M3 occur periodically at length distances of about 1.5 m. The diameter deviations are substantially due to cutting processes and the adjustment behavior of the diameter control.

Two rows R1 and R2 of separated tube pieces are schematically plotted underneath the diameter curve. The upper row R1 shows tube pieces 21; 22 with a cutting length S of 1.5 m according to the above-explained example. The cuts T1, T2, T2 extend in the middle relative to those longitudinal sections of the tubular strand that must each be assigned to an allowance 23. It can be seen that the minima M1, M2 and M3 of the diameter curve come to lie substantially within the respective allowance regions 23. The tube pieces 21, 22 are then divided in the middle (middle M).

The lower row R2 shows tube pieces 24; 25 with a cutting length S of 1.5 m without consideration of an allowance. It can be seen that in this case the minima M1, M3 and M3 of the diameter curve substantially come to lie in the end regions of the tube pieces 24; 25 where they are less harmful in general.

By comparison, it is true that the diameter profile of FIG. 3, which must be assigned to a method according to the prior art, shows similar variations of the diameter and particularly similar minima M4, M5, M6 of the diameter as does the profile of FIG. 2, but the periodicity of the minima is less pronounced, which can mainly be ascribed to changed height positions of the separation plane.

As schematically shown by the tubular strand piece R3, this may have the effect that tube pieces 26; 27 are cut out in which the corresponding minima M4, M5, M6 of the diameter variation are statistically distributed, and often also come to lie in the middle region, as can clearly be seen e.g. at the minima M4 and M5.

Even in the case of a stationary separation zone the same problem will arise if the separation plane T has a distance from the shaping zone 9 that is chosen such that the quartz glass mass present at said place does not yield a quartz glass strand of a length that does not correspond to an integral multiple of the cutting length S (here also 1.5 m).

The invention claimed is:

1. A drawing method for producing cylindrical components of quartz glass, said method comprising:
    drawing off a quartz glass strand in a direction of a drawing axis from a shaping zone of a quartz glass mass and
    repeatedly separating sections each having a respective separating length from the quartz glass strand and an end diameter, wherein each of the separating lengths is substantially equal to a cutting length, and
    producing the cylindrical components from the sections, wherein the quartz glass strand is separated at a separation position that is at a distance from a position in the shaping zone at which the quartz glass strand has a diameter that is 20% greater than the end diameter, and
    the method further comprising
    setting the distance of the separation position from the position in the shaping zone based on the cutting length,
    wherein the separation position is selected such that the quartz glass strand obtained from the quartz glass mass has a length between the position in the shaping zone and the separation position that is one time or a plurality of times the cutting length, and such that a disorder in the quartz glass strand geometry caused by the separation, in a subsequent separation step, is located in an end region of one of the components or between two of adjacent components.

2. The drawing method according to claim 1, wherein, in the shaping zone, a quartz glass cylinder is continuously fed to a heating zone, softened therein zonewise and drawn off so as to form a drawing bulb of the quartz glass strand.

3. The drawing method according to claim 1 wherein the quartz glass strand is a tubular quartz glass strand that is drawn off from the shaping zone with a pressure being produced and maintained in the tubular quartz glass strand.

4. The drawing method according to claim 3, wherein the tubular quartz glass strand comprises a lower end that is closed at least in part by a gaseous, liquid, plasma-like or solid flow obstacle.

5. The drawing method according to claim 3, wherein the tubular quartz glass strand is drawn off with a wall thickness in a range of from 0.1 mm to 6 mm.

6. The drawing method according to claim 1, wherein the distance of the separation position from the shaping zone is such that the quartz glass strand obtained from the quartz glass mass between the shaping zone and the separation position has a length that is three to ten times the cutting length.

7. The drawing method according to claim 1, wherein said separating the quartz glass strand comprises providing the quartz glass strand with a predetermined breaking point at a first point in time and separating the quartz glass strand at the separation position at a second point in time by a force acting in an area of the predetermined breaking point.

8. The drawing method according to claim 7, wherein the cutting length is an integral multiple of a predetermined section length, and the predetermined breaking point is formed at a predetermined breaking point forming position that has a distance from the separation position corresponding to the predetermined section length or a multiple thereof.

9. The drawing method according to claim 7, wherein forming the predetermined breaking point at a predetermined breaking point forming position and separating the quartz glass strand are performed at substantially the same time.

10. The drawing method according to claim 1, wherein disorders in the quartz glass strand geometry are detected continuously and the separation position is set in response to the detected disorders.

11. The drawing method according to claim 4, wherein a tubular quartz glass strand is drawn off with a wall thickness in a range of from 0.1 mm to 6 mm.

* * * * *